(12) United States Patent
Yoshikawa et al.

(10) Patent No.: US 10,737,599 B2
(45) Date of Patent: Aug. 11, 2020

(54) OCCUPANT POSTURE ADJUSTING DEVICE OF VEHICLE SEAT

(71) Applicant: HONDA MOTOR CO., LTD., Minato-ku, Tokyo (JP)

(72) Inventors: Kenichi Yoshikawa, Wako (JP); Makoto Ota, Wako (JP); Tomoo Ito, Wako (JP); Kenta Hirayama, Wako (JP); Atsumi Sakurai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/259,573

(22) Filed: Jan. 28, 2019

(65) Prior Publication Data

US 2019/0248260 A1    Aug. 15, 2019

(30) Foreign Application Priority Data

Feb. 13, 2018 (JP) ................. 2018-023372

(51) Int. Cl.
*B60N 2/66* (2006.01)
*A47C 7/46* (2006.01)
*B60N 2/62* (2006.01)
*B60N 2/70* (2006.01)
*B60N 2/22* (2006.01)

(52) U.S. Cl.
CPC ............ *B60N 2/6673* (2015.04); *B60N 2/62* (2013.01); *A47C 7/46* (2013.01); *B60N 2/22* (2013.01); *B60N 2/70* (2013.01)

(58) Field of Classification Search
CPC ........ B60N 2/6673; B60N 2/914; B60N 2/62; A47C 7/46; A47C 7/467; A47C 7/142
See application file for complete search history.

(56) References Cited

U.S. PATENT DOCUMENTS 4,182,533 A * 1/1980 Arndt ..................... A47C 7/462
297/284.4
6,619,739 B2 * 9/2003 McMillen .............. A47C 7/462
297/284.7

(Continued)

FOREIGN PATENT DOCUMENTS

DE          4013679 A1 * 11/1990  ............... B60N 2/16
DE         19938698 A1 *  2/2001  ............. B60N 2/646

(Continued)

*Primary Examiner* — Timothy J Brindley
(74) *Attorney, Agent, or Firm* — Armstrong Teasdale LLP

(57) ABSTRACT

An occupant posture adjusting device includes: a plate-shaped bottom support member pivotably supported by a seat cushion via a pivot shaft extending laterally at a position directly under a hip point of a seated occupant to support at least thighs of the occupant from below; a plate-shaped lower part support member pivotably supported by a seat back via a pivot shaft extending laterally at a position lower than an intermediate portion of the seat back to support at least a pelvis of the occupant; a plate-shaped upper part support member pivotably supported by the seat back via a pivot shaft extending laterally at a position higher than the intermediate portion to support at least scapulae of the occupant; first to third drive devices configured to drive the bottom support member, lower part support member, and upper part support member, respectively; and a control device configured to control the drive devices.

18 Claims, 11 Drawing Sheets

(56) References Cited

U.S. PATENT DOCUMENTS

| | | | | |
|---|---|---|---|---|
| 7,152,920 B2 * | 12/2006 | Sugiyama | ............... | B60N 2/002 |
| | | | | 297/284.6 |
| 2003/0038517 A1 * | 2/2003 | Moran | ................... | B60N 2/914 |
| | | | | 297/284.3 |
| 2003/0111885 A1 * | 6/2003 | McMillen | ................ | B60N 2/66 |
| | | | | 297/284.4 |
| 2003/0117002 A1 * | 6/2003 | McMillen | ................ | A47C 7/462 |
| | | | | 297/284.4 |
| 2003/0230917 A1 * | 12/2003 | Dorfler | ................. | B60N 2/914 |
| | | | | 297/284.1 |
| 2010/0117414 A1 | 5/2010 | Hwang et al. | | |
| 2011/0285189 A1 * | 11/2011 | Petzel | ...................... | B60N 2/56 |
| | | | | 297/284.1 |
| 2016/0374475 A1 * | 12/2016 | Aldrich | ................. | A47C 7/462 |
| | | | | 297/284.3 |
| 2017/0008480 A1 * | 1/2017 | Ohno | ...................... | B60R 16/02 |
| 2018/0304786 A1 | 10/2018 | Yokoyama et al. | | |

FOREIGN PATENT DOCUMENTS

| | | | | |
|---|---|---|---|---|
| DE | 10135122 C1 * | 12/2002 | ........... | B60N 2/6671 |
| EP | 1010570 A2 * | 6/2000 | ........... | B60N 2/1803 |
| FR | 2994073 A1 * | 2/2014 | ............ | B60N 2/666 |
| JP | 62039338 A * | 2/1987 | ............ | B60N 2/914 |
| JP | H06286508 A | 10/1994 | | |
| JP | 2010115474 A | 5/2010 | | |
| JP | 2017081361 A | 5/2017 | | |
| WO | WO-2006105989 A1 * | 10/2006 | ........... | B60N 2/0232 |
| WO | WO-2014073463 A1 * | 5/2014 | ............... | B60N 2/66 |
| WO | WO-2017199586 A1 * | 11/2017 | ............. | B60N 2/976 |

\* cited by examiner ately adjusting the posture of an occupant seated in a vehicle seat. Many of them use air cushions as actuators and adjust the pressure in the air cushions under feedback control by monitoring the outputs from pressure sensors configured to detect the pressure in the air cushions (see JPH6-286508A and JP2010-115474A, for example). The pressing by the air cushions can be controlled finely through selection of sizes and positions of the air cushions and adoption of various types of air pressure control. However, the pressure in the air cushion that is monitored is not directly related to the actual feeling of the occupant; namely, the control is conducted based on indirect physical quantities instead of actual sensory indices.

OCCUPANT POSTURE ADJUSTING DEVICE OF VEHICLE SEAT

TECHNICAL FIELD

The present invention relates to an occupant posture adjusting device of a vehicle seat.

BACKGROUND ART

There are various types of posture adjusting devices for appropri
The occupant posture adjusting device (vehicle seat control device) disclosed in JPH6-286508A includes a seat reclining mechanism for adjusting an angle of a seat back of a seat, a reclining sensor for detecting an angle of the seatback, first and second air cushions respectively disposed in an upper part and a lower part of the seat back, first and second pressure control units (solenoid valves) for respectively controlling the internal pressures of the first and second air cushions, first and second pressure sensors for respectively detecting the internal pressures of the first and second air cushions, a first storage unit storing seat back control data defining a prescribed correlation between the angle of the seat back and the ratio of the internal pressures of the first and second air cushions, and an operation control unit configured to control the seat reclining mechanism according to the output signals of the first and second pressure sensors or to control the first and second pressure control units according to the output signal from the reclining sensor so as to satisfy the prescribed correlation defined by the seat back control data. The vehicle seat control device disclosed in JPH6-286508A further includes a seat slide mechanism for adjusting the position of the seat in the fore and aft direction, a slide sensor for detecting the position of the seat, third and fourth air cushions disposed in a seat cushion to respectively support buttocks and thighs of an occupant seated in the seat, third and fourth pressure control units for respectively controlling the internal pressures of the third and fourth air cushions, third and fourth pressure sensors for respectively detecting the internal pressures of the third and fourth air cushions, and a second storage unit storing seat cushion control data defining a prescribed correlation between the fore-and-aft position of the seat and the ratio of the internal pressures of the third and fourth air cushions, wherein the operation control unit controls the seat slide mechanism according to the output signals of the third and fourth pressure sensors or controls the third and fourth pressure control units according to the output signal from the slide sensor so as to satisfy the prescribed correlation defined by the seat cushion control data. The vehicle seat control device disclosed in JPH6-286508A further includes a front vertical mechanism for adjusting the height of the front end portion of the seat and a rear vertical mechanism for adjusting the height of the rear end portion of the seat, and the operation control unit may control the front and rear vertical mechanisms in addition to the seat slide mechanism according to the output signals of the third and fourth pressure sensors to satisfy the prescribed correlation defined by the seat cushion control data.

JP2010-115474A (also published as US2010/0117414A1) discloses an intelligent vehicle seat support system capable of automatically providing a passenger with a seat form suitable for the passenger although the passenger does not directly control the seat support system. The vehicle seat support system disclosed in JP2010-115474 includes an air storage tank for storing air and supplying the air when needed, a plurality of air cushions disposed in a vehicle seat in contact with a human body, and configured to selectively expand and shrink depending on the air flow, a pressure sensor for measuring air pressure of each air cushion, an air control valve disposed between the air storage tank and the air cushions, and configured to control the air that flows into each of the air cushions, and a control unit for, when a passenger takes the vehicle seat, automatically controlling the air control valve so that it starts injecting air into each of the air cushions, and, when the air pressure of each air cushion is higher than a preset reference value, controlling the air control valve so that it stops injecting air into each air cushion. In the intelligent vehicle seat support system disclosed in JP2010-115474A, the pressure difference between a left-side of the air cushions and a right-side of the air cushions may be determined, and, if the pressure difference exceeds the second preset reference value and the time duration during which the pressure difference is maintained exceeds the preset time period, the posture of the passenger is determined to have changed.

In occupant posture adjusting devices using air cushions, there is a large degree of freedom in arrangement of the air cushions, and it is relatively easy to incorporate many air cushions in the seat back to localize an area pressed by each air cushion. However, if a high pressing force is applied to a narrow area of the body of the seated occupant, it would cause discomfort to the occupant.

JP2017-81361A (also published as US2018/0304786A1) discloses a vehicle seat including a support mechanism for pressing and supporting a seated occupant's back. The vehicle seat disclosed in JP2017-81361A includes a seat cushion on which an occupant is seated, and a seat back on which the back of the occupant seated on the seat cushion reclines. The seat back includes a urethane pad having its surface covered with a trim cover, and a pressing device having a resin plate for supporting a part of the urethane pad, a laterally extending shaft, and press members arranged at upper and lower sides in a longitudinal direction with respect to the shaft at the back side of the urethane pad surface covered with the trim cover. The laterally extending shaft of the pressing device is rotated or oscillated in one direction so that the press member at the upper side presses an upper part of the urethane pad forward via the resin plate. The laterally extending shaft of the pressing device is rotated or oscillated in a direction opposite to the one direction so that the press member at the lower side presses a lower part of the urethane pad forward via the resin plate. Thereby, the mechanism unit for pressing and supporting the lumbar and the pelvis of the occupant seated on the vehicle seat may be simply configured with fewer components.

SUMMARY OF THE INVENTION

A primary object of the present invention is to provide an occupant posture adjusting device of a vehicle seat which can support an occupant seated in the seat with an appropriate body pressure distribution and adjust the posture of the seated occupant to cause less fatigue to the occupant.

To achieve the above object, one embodiment of the present invention provides an occupant posture adjusting device (1) of a vehicle seat (2) including a seat cushion (3) and a seat back (4) connected to a rear end of the seat cushion, the occupant posture adjusting device comprising: a plate-shaped bottom support member (7) pivotably supported by the seat cushion via a pivot shaft (17) extending laterally at a position directly under a hip point (HP) of an occupant seated in the seat, such that the bottom support member supports at least thighs of the occupant from below; a plate-shaped lower part support member (8) pivotably supported by the seat back via a pivot shaft (18) extending laterally at a position lower than an intermediate portion of the seat back with respect to a vertical direction, such that the lower part support member supports at least a pelvis of the occupant from behind; a plate-shaped upper part support member (9) pivotably supported by the seat back via a pivot shaft (19) extending laterally at a position higher than the intermediate portion of the seat back with respect to the vertical direction, such that the upper part support member supports at least scapulae of the occupant from behind; first to third drive devices (10, 11, 12) configured to drive the bottom support member, the lower part support member, and the upper part support member, respectively; and a control device (13) configured to control the first to third drive devices.

According to this arrangement, it is possible to control the seated occupant's body pressure distribution and adjust the occupant's posture to cause less fatigue to the occupant by adjusting the angle of each of the bottom support member, the lower part support member, and the upper part support member about the respective pivot axes by coordinately controlling the first to third drive devices by the control device.

In the foregoing occupant posture adjusting device, the control device controls the bottom support member, the lower part support member, and the upper part support member occupant each being plate-shaped to rotate about the respective pivot shafts to adjust the posture of the seated occupant. Namely, the posture control means is structured by these three support members. The control of the bottom support member about the pivot shaft may affect the rearward tilt angle of the pelvis. When the rearward tilt angle of the pelvis changes, the shape of the back (spine) also changes and the body pressure distribution on the seat back is also affected. Therefore, it is preferred that the rearward tilt angle of the pelvis be controlled most accurately. When the bottom support member is rotated about the pivot shaft and the tilt angle of the pelvis is changed, it is preferred that the rotation angle change about the pivot shaft and the rearward tilt angle change of the pelvis correspond to each other or be related linearly to each other. In the aforementioned occupant posture adjusting device, the pivot shaft of the plate-shaped bottom support member is located directly under the hip point, and therefore, the rotation angle change about the pivot shaft and the rearward tilt angle of the pelvis substantially correspond to each other. Therefore, the control device can easily determine or calculate control target values easily compared to other structures. Thus, the aforementioned occupant posture adjusting device can adjust the seated occupant's body pressure distribution based on the body pressures distribution on the pelvis, waist, and back of the seated occupant individually, to achieve a posture of the occupant causing less fatigue to the occupant. The three support members for adjusting the shape of the seat cushion and seat back are each plate-shaped or have a two-dimensional spread, and therefore, the pressure applied by each support member does not tend to be applied on a localized area of the body part of the occupant.

In the above arrangement, preferably, the occupant posture adjusting device further comprises front and rear first body pressure sensors (14) associated with the bottom support member, the front and rear first body pressure sensors being disposed at positions corresponding to one of the thighs and one of ischia of the seated occupant, respectively, wherein the control device is configured to control the first drive device (10) based on a comparison between outputs from the front and rear first body pressure sensors.

The bottom support member mainly contacts the thighs and buttocks (particularly, ischia) of the seated occupant. According to above arrangement, the body pressure sensors for detecting the seated occupant's body pressure include pressure sensors disposed at positions corresponding to at least one thigh and one ischium of the seated occupant. Therefore, the pressures detected by these body pressure sensors are closely related to the feeling of the occupant, whereby the adjustment based on the outputs of these sensors can reliably achieve an occupant's posture (or body pressure distribution) comfortable to the occupant.

In the above arrangement, preferably, the occupant posture adjusting device further comprises upper and lower second body pressure sensors (15) associated with the lower part support member, the upper and lower second body pressure sensors being disposed at positions corresponding to a waist and one of ilia of the seated occupant, respectively, wherein the control device is configured to control the second drive device (11) based on a comparison between outputs from the upper and lower second body pressure sensors.

The lower part support member mainly contacts the lumbar spine and the pelvis (particularly, ilia) of the seated occupant. According to the above arrangement, the body pressure sensors for detecting the seated occupant's body pressure include pressure sensors disposed at positions corresponding to at least the lumbar spine and one ilium of the seated occupant. Therefore, the pressures detected by these body pressure sensors are closely related to the feeling of the occupant, whereby the adjustment based on the outputs of these sensors can reliably achieve an occupant's posture (or body pressure distribution) comfortable to the occupant.

In the above arrangement, preferably, the control device is configured to operate the second drive device subsequent to operation of the first drive device.

According to this arrangement, the adjustment by the first drive device and the second drive device can be performed smoothly.

In the above arrangement, preferably, the occupant posture adjusting device further comprises at least one third body pressure sensor (16) associated with the upper part support member, the at least one third body pressure sensor being disposed at a position corresponding to one of the scapulae of the seated occupant, wherein the control device is configured to control the third drive device (12) based on a comparison between an output from the third body pressure sensor and the output from the upper second body pressure sensor.

The upper part support member mainly contacts the scapulae of the seated occupant. According to above arrangement, the body pressure sensors for detecting the seated occupant's body pressure include a pressure sensor located at a position corresponding to at least one scapula of the seated occupant. Therefore, the pressure detected by the body pressure sensor is closely related to the feeling of the occupant, whereby the adjustment based on the output of the sensor can reliably achieve an occupant's posture (or body pressure distribution) comfortable to the occupant.

In the above arrangement, preferably, the control device is configured operate the third drive device subsequent to operation of the second drive device.

According to this arrangement, the adjustment by the second drive device and the third drive device can be performed smoothly.

In the above arrangement, preferably, the control device is configured to cause the first drive device and the second drive device to maintain operation states thereof before activating the third drive device.

The shape of the upper part of the seat back is affected not only by the body pressure on the upper part (shoulder) of the back but also by the body pressure on the lower part (waist) of the back. Therefore, if the body pressure on the lower part of the back changes after the adjustment of the body pressure on the upper part of the back, the adjustment of the body pressure on the upper part of the back may need to be performed again. Further, the pelvis is a base defining the overall posture of the occupant, and therefore, if the tilt angle of the pelvis is changed due to adjustment of the shape of the seat cushion by the first drive device, the adjustment by the lower part of the seat back by the second drive device and the adjustment by the upper part of the seat back by the third drive device may need to be performed again. According to the above arrangement, the control device controls the third drive device to adjust the shape of upper part of the seat back after the shape of the seat cushion has been adjusted and the shape of the lower part of the seat back has been adjusted, and the shape of the seat cushion and the shape of the lower part of the seat back are maintained during the adjustment of the upper part of the seat back. Therefore, the adjustment of the upper part of the seat back does not need to be repeated, and thus, overall adjustment of the seat can be performed quickly.

In the above arrangement, preferably, the comparison is performed to determine whether a difference between pressures indicated by the outputs exceeds a predetermined threshold value.

According to this arrangement, a body pressure difference between different positions is controlled to be smaller than a predetermined value. Thereby, appropriate body pressure distribution can be achieved easily.

In the above arrangement, preferably, the control device includes a manual input device configured to receive input from the occupant, and the comparison is performed based on a mode selected by the occupant using the manual input device.

According to this arrangement, the control of the first, second, and/or third drive devices by the control device based on the comparison between outputs from relevant body pressure sensors can be performed flexibly according to the mode selected by the occupant. The mode may include a natural environment mode which depends on natural environment conditions such as temperature, weather, season, and time zone, an occupant's driving preference mode (sport, comfort, etc.), and a road mode depending on the traveling conditions such as road surface conditions, highway, mountain path, etc. By allowing the occupant to input and specify these modes, it is possible to adjust the occupant's posture in accordance with the input mode to thereby improve the satisfaction of the occupant.

According to the foregoing arrangement, it is possible to provide an occupant posture adjusting device of a vehicle seat which can support an occupant seated in the seat with an appropriate body pressure distribution and adjust the posture of the seated occupant to cause less fatigue to the occupant.

DESCRIPTION OF THE PREFERRED EMBODIMENT(S)

An embodiment of an occupant posture adjusting device 1 of a vehicle seat 2 according to the present invention will be described with reference to the appended drawings. In the following description, directions such as front, rear, right, left, up, and down are defined relative to the occupant seated in the seat 2 (namely, relative to the vehicle in which the seat 2 is mounted).

Figure 1:
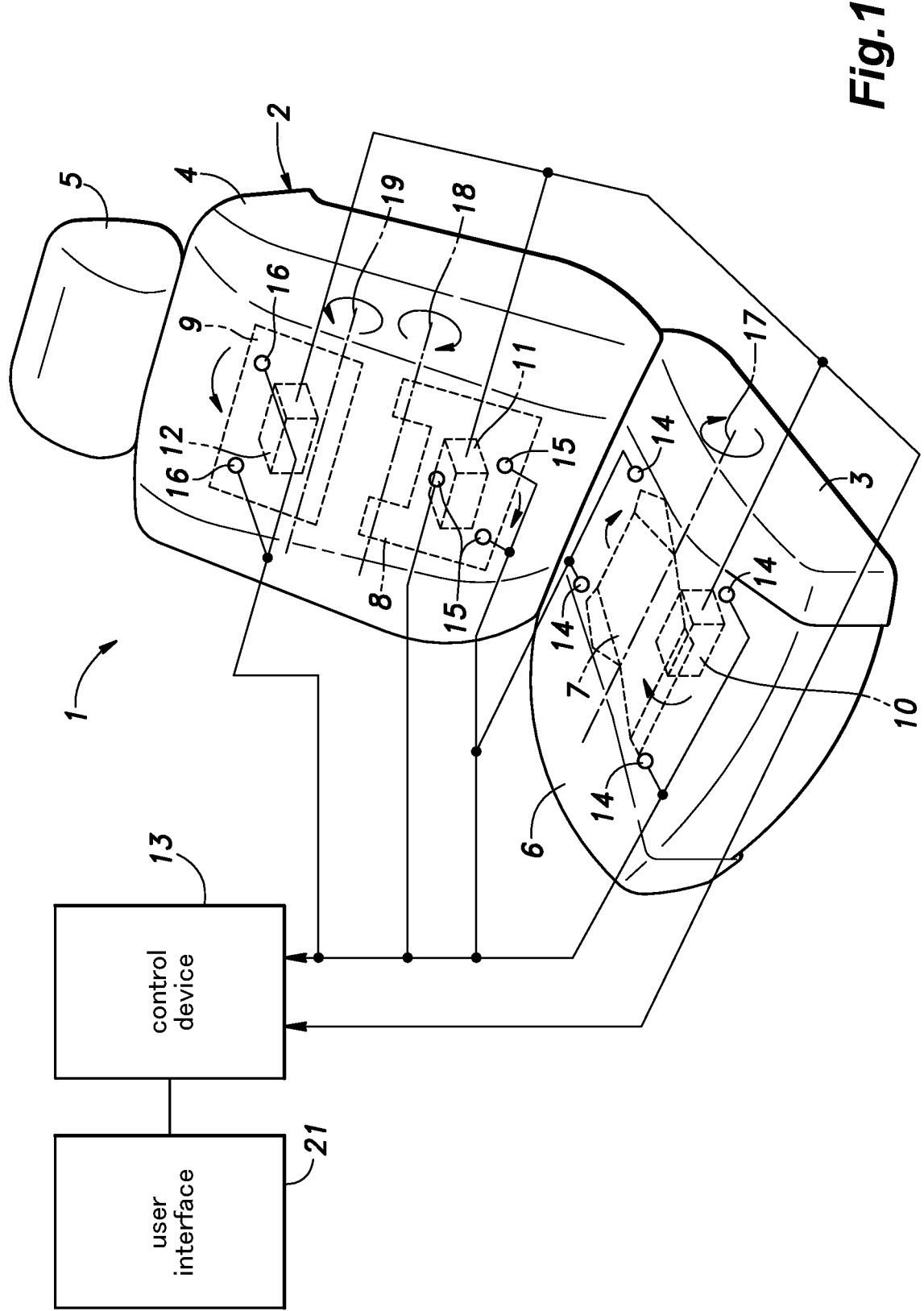
FIG. 1 is a perspective view of an embodiment of an occupant posture adjusting device of a vehicle seat.

As shown in FIG. 1, the seat 2 includes a seat cushion 3 configured to support buttocks of the seated occupant, a seat back 4 coupled to a rear end of the seat cushion 3 and configured to support the back of the seated occupant, and a head rest 5 coupled to an upper end of the seat back 4 and configured to support the head of the seated occupant. Each of these parts includes a frame as a skeleton which is embedded in padding material (not shown in the drawings) and covered by a seat skin material 6.

The seat cushion 3 on which the buttocks of the seated occupant are to be supported is incorporated with a bottom support member 7 for dispersing the body pressure on the thighs 51 and the buttocks of the occupant. The seat back 4 is incorporated with a lower part support member 8 for variably controlling the pressure with which the lower part of the back of the occupant is to be supported. The seat back 4 is further incorporated with an upper part support member 9 for variably controlling the pressure with which the upper part of the back of the occupant is to be supported. Under the bottom support member 7 is disposed a first drive device 10 for moving up and down the front part of the bottom support member 7. Behind the lower part support member 8 is disposed a second drive device 11 for moving the lower end of the lower part support member 8 forward and rearward. Behind the upper part support member 9 is disposed a third drive device 12 for moving the upper end of the upper part support member 9 forward and rearward.

A control device 13 is connected to the first to third drive devices 10-12. Near the bottom support member 7 are disposed front and rear first body pressure sensors 14. The front and rear first body pressure sensors 14 include a front pair and a rear pair, each pair including left and right pressure sensors. Near the lower part support member 8 are disposed upper and lower second body pressure sensors 15. In this embodiment, one upper second body pressure sensor 15 is disposed at a central part of the seat cushion 3 with respect to the width direction (lateral direction), and two lower second body pressure sensors 15 are provided to be spaced apart from each other in the lateral direction. Near the upper part support member 9 are provided two third body pressure sensors 16 spaced apart from each other in the lateral direction.

In the present embodiment, the first to third drive devices 10-12 are each driven by a screw mechanism including a motor as an actuator (not shown in the drawings) such that the pressure applied thereby is variably controlled. The control device 13 is communicably connected with the first to third drive devices 10-12, and is configured to operate the first to third drive devices 10-12 in accordance with the outputs from the first to third body pressure sensors 14-16. The first to third drive devices 10-12 each include a controller for controlling the actuator in accordance with commands from the control device 13.

The interior of the seat 2 is filled with padding material (not shown in the drawings), and the entirety of the seat 2 is covered by the seat skin material 6. The first to third body pressure sensors 14-16 are pasted onto a surface of the padding material at positions near where the bottom support member 7, the lower part support member 8, and the upper part support member 9 are embedded, such that at least two sensors are provided for each of the bottom support member 7 and the lower part support member 8, and at least one sensor is provided for the upper part support member 9. In the illustrated embodiment, four first body pressure sensors 14 are provided for the bottom support member 7, three second body pressure sensors 15 are provided for the lower part support member 8, and two third body pressure sensors 16 are provided for the upper part support member 9.

Each functional block of the control device 13 will be described with reference to FIG. 2. The control device 13 includes a central processing unit 20, which is communicably connected with a user interface 21 and the first to third drive devices 10-12.

The user interface 21 is communicably connected with the central processing unit 20 via a user interface I/O 22 provided in the control device 13, and serves as a manual input device. The user interface I/O 22 is configured to be capable of transmitting user display information to the user interface 21. The user interface I/O 22 is further configured to be capable of receiving a vehicle driving mode and settings information from the user interface 21. For example, the user interface 21 may be embodied as a touch panel display capable of receiving user inputs and displaying various information.

The control device 13 includes a pressure sensor I/O 23 for communicating data with the pressure sensors. The pressure sensor I/O 23 is configured to be capable of receiving the pressure signals from the first to third body pressure sensors 14-16 and forwarding the received pressure signals to the central processing unit 20. The control device 13 further includes a drive device I/O 25 for communicable connection with the first to third drive devices 10-12. The drive device I/O 25 is connected to be capable of receiving and transmitting I/O commands and data such that the actuators (not shown in the drawings) included in the first to third drive devices 10-12 are controlled to drive the bottom support member 7, the lower part support member 8 and the upper part support member 9, respectively.

The central processing unit 20 includes a drive device control unit 24 for outputting control signals to the first to third drive devices 10-12 via the drive device I/O 25. The central processing unit 20 further includes a storage 31 configured to store the vehicle driving mode and settings information. The vehicle driving mode and settings information input through the user interface 21 are stored in the storage 31. The central processing unit 20 includes a pressure sensor measurement unit 32 configured to perform sampling of data from the pressure sensors, temporal storage of the received data, and measurement data processing such as digital filtering. The central processing unit 20 includes a first adjustment module 26, a second adjustment module 27, and a third adjustment module 28 as internal modules, and further includes a flow control unit 29 configured to control the control flow of these adjustment modules and a timer 30.

The flow control unit 29 is connected with the storage 31, the pressure sensor measurement unit 32, the drive device control unit 24, the first adjustment module 26, the second adjustment module 27, and the third adjustment module 28 through a data bus, and is configured to perform the flow control using an interrupt from the timer 30.

Now, with reference to FIGS. 3 to 5, description will be made of an arrangement of the bottom support member 7, the lower part support member 8, and the upper part support member 9 incorporated in the seat cushion 3 and the seat back 4. FIG. 6 also should be referred to when description is made of the relationship with the bones in the waist and chest.

Figure 3:
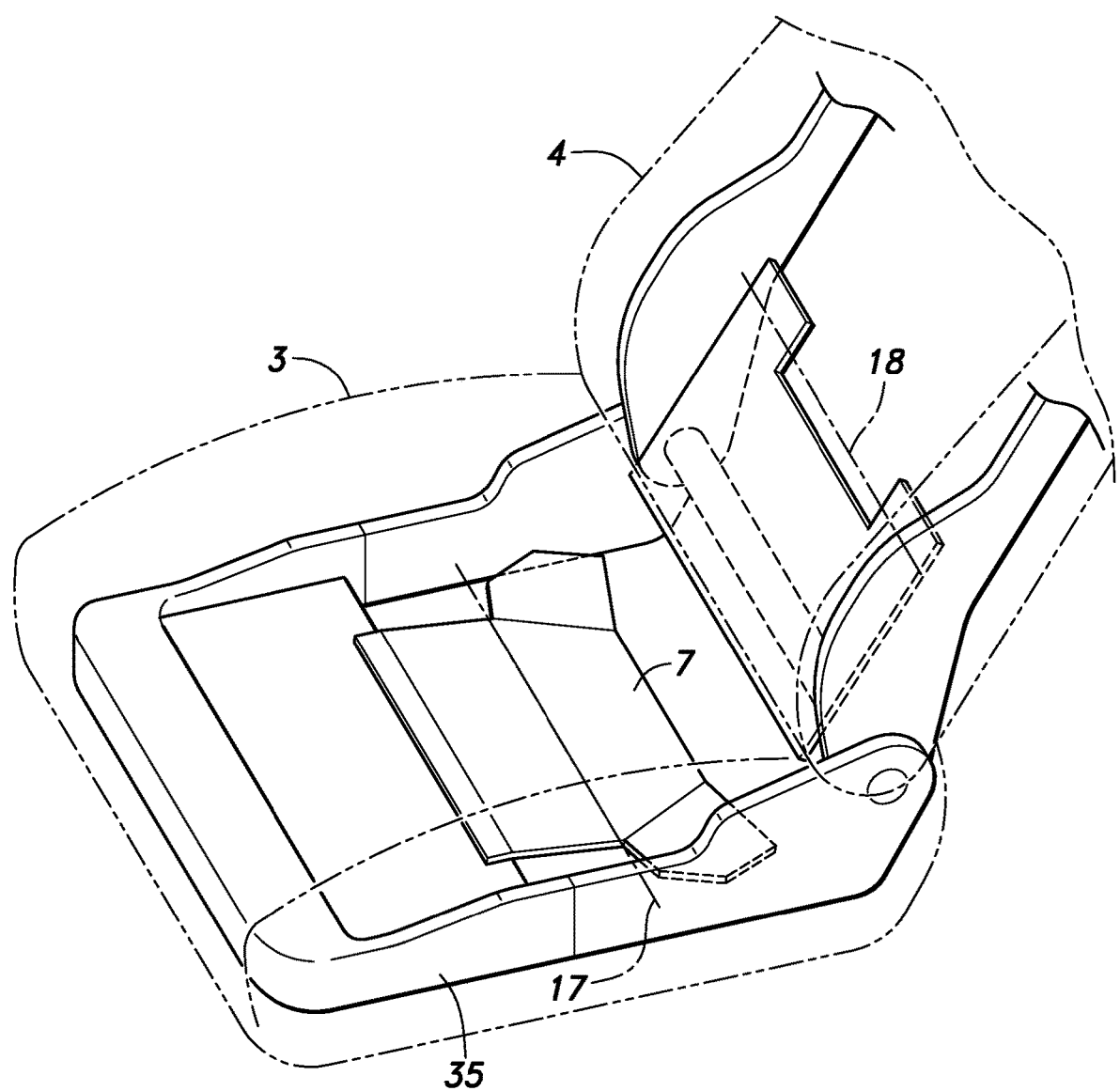
FIG. 3 is a perspective view showing a structure inside the vehicle seat including a bottom support member, with the exterior of the vehicle seat shown by phantom lines.
Figure 4:
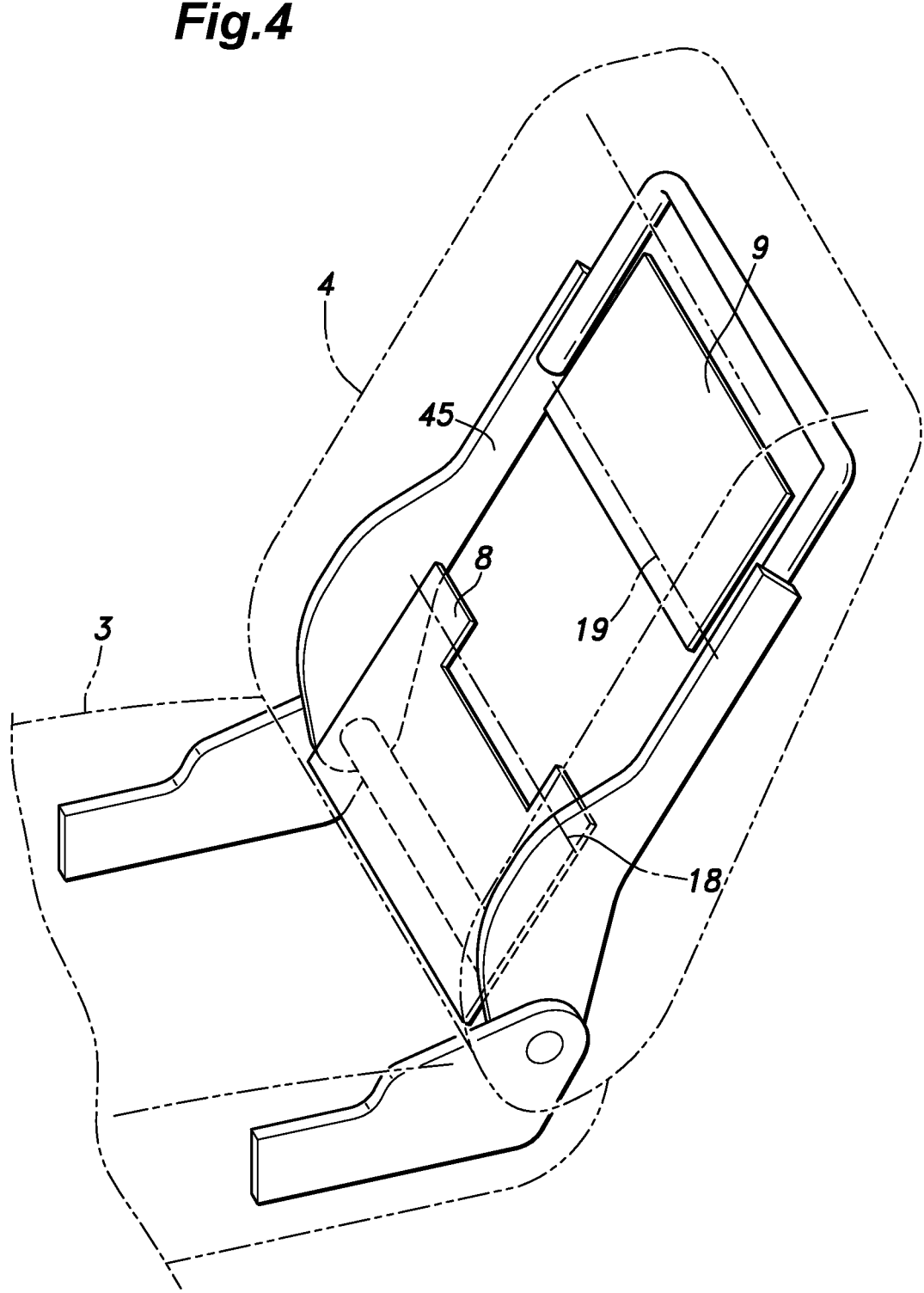
FIG. 4 is a perspective view showing a structure inside the vehicle seat including upper and lower part support members, with the exterior of the vehicle seat shown by phantom lines.
Figure 5:
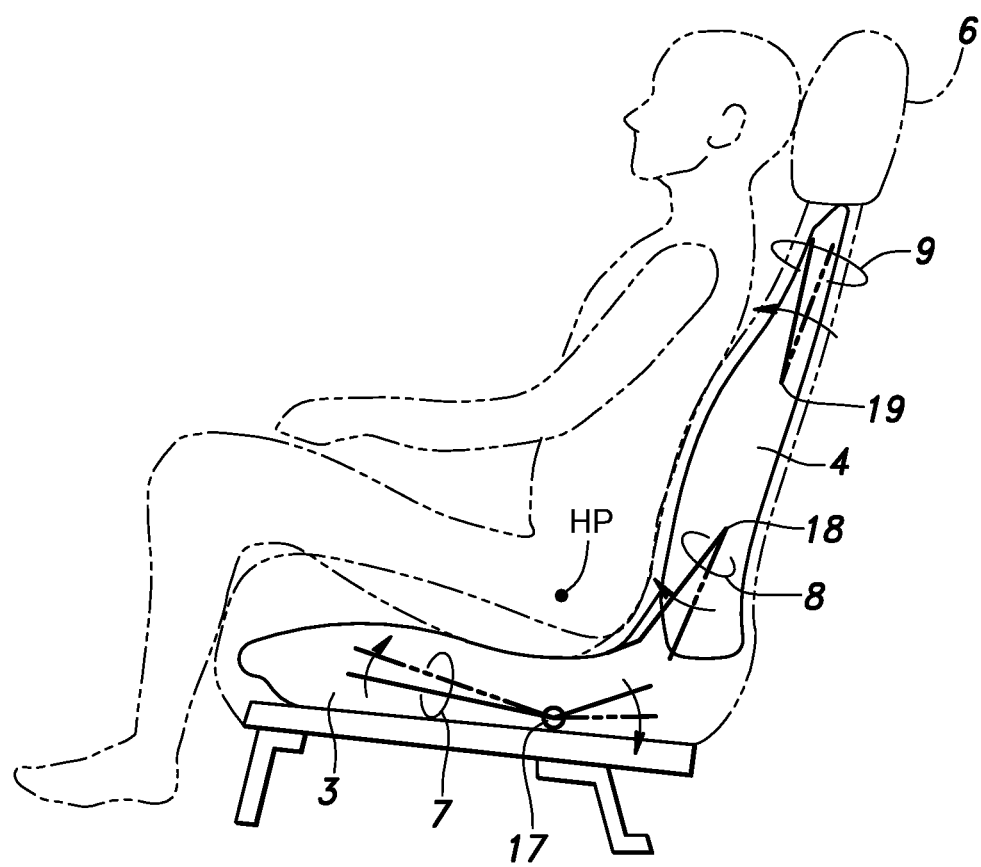
FIG. 5 is a side view of the vehicle seat for explaining a positional relationship between a pivot shaft for the bottom support member and a hip point of the occupant seated in the vehicle seat.
Figure 6:
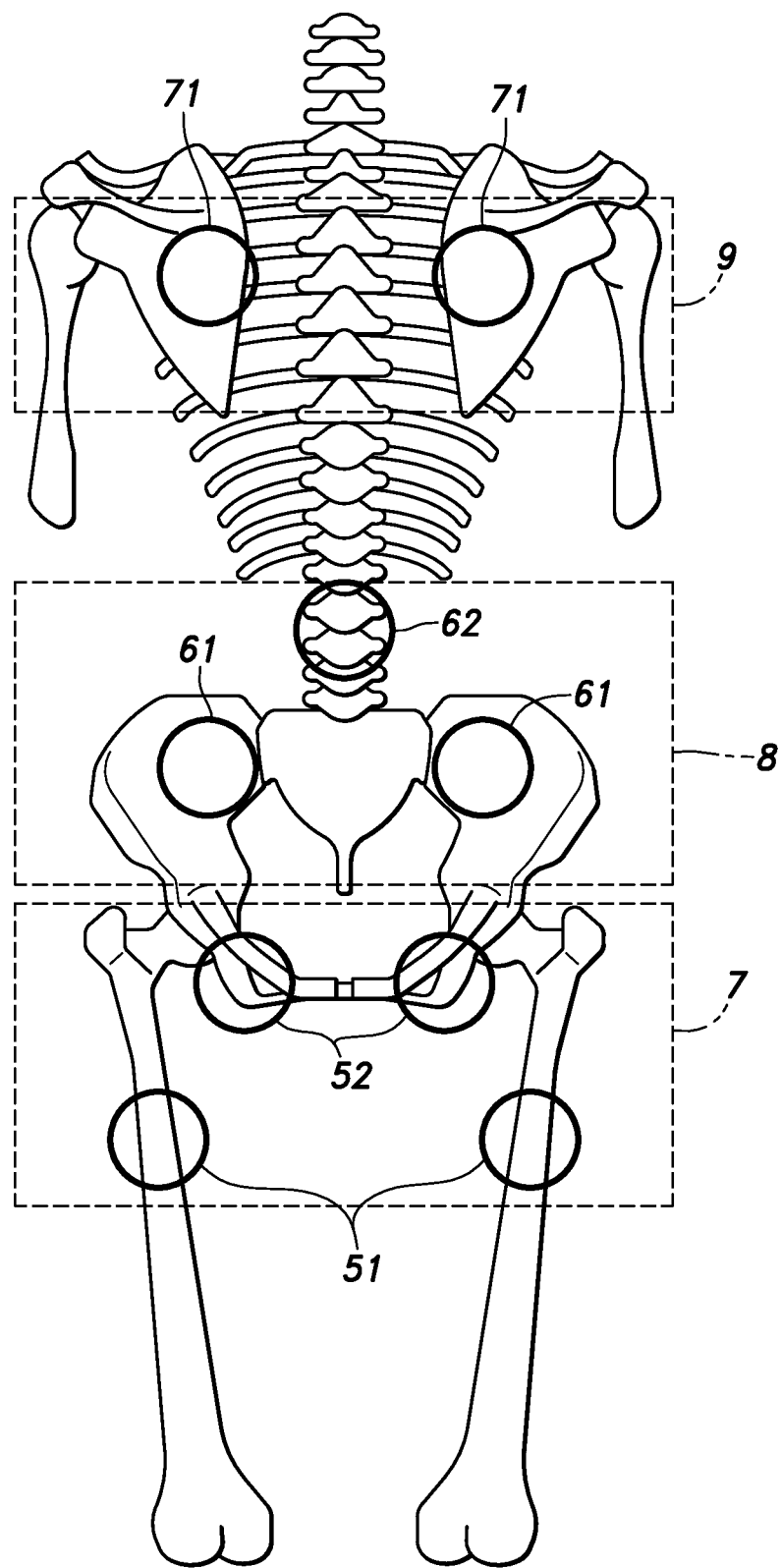
FIG. 6 is a schematic front view of the vehicle seat for explaining arrangement of body pressure sensors of the occupant posture adjusting device.

As shown in FIGS. 3 to 5, the bottom support member 7 has a front part having a widthwise (lateral) dimension sufficient to be able to push up the thighs 51 of the seated occupant and a rear part configured to support the ischia 52 of the occupant, and is disposed in the seat cushion 3 such that the rear part supporting the ischia 52 is lowered when the front part supporting the thighs 51 is raised. Namely, the bottom support member 7 is disposed in a position favorable for dispersing the body pressure on the ischia 52 to the thighs 51 in accordance with a specific posture of the occupant. Thus, because the bottom support member 7 is arranged such that the front part thereof supports the thighs 51 of the occupant (or the vicinity of the thighs 51), the thighs 51 of the occupant can be adjustably raised such that the body pressure is dispersed between the thighs 51 and the ischia 52, whereby a vehicle seat highly comfortable to the occupant is provided.

The bottom support member 7 is plate-shaped and is pivotably supported by a pivot shaft 17 extending laterally at a position directly under a hip point HP of the seated occupant (shown in FIG. 5) between front part of the thighs 51 and the ischia 52. When the front part of the bottom support member 7 is moved up to push up the thighs 51, the rear part of the bottom support member 7 (and hence the ischia 52 supported thereby) is lowered so that the body pressure on the ischia 52 is reduced. Conversely, when the front part of the bottom support member 7 (and hence the thighs 51 supported thereby) is lowered while the rear part of the bottom support member 7 supporting the ischia 52 or a part of the pelvis contacting the seating surface is raised, and the body pressure on the ischia 52 is increased. The pivot shaft 17 of the plate-shaped bottom support member 7 is disposed to extend laterally at a position directly under the hip point HP, and is pivotably supported by a seat cushion frame 35. Thereby, a rotation angle change of the pivot shaft 17 and a rearward tilt angle change of the ilia 61 (or pelvis) of the seated occupant substantially correspond to each other.

The lower part support member 8 is disposed behind a surface of a lower part of the seat back 4 supporting the ilia 61 of the seated occupant and has a widthwise (lateral) dimension sufficient to be able to push the ilia 61 of the occupant forward. An upper part of the lower part support member 8 extends upward to a position substantially corresponding to the seated occupant's waist 62 including a third lumbar spine. Namely, the lower part support member 8 is disposed in a position favorable for correcting a rearward tilt of the occupant's ilia 61 (or pelvis) and dispersing the body pressure in accordance with a specific shape of the occupant's back. The lower part support member 8 is pivotably supported, at an upper end part thereof, by a seat back frame 45 via a pivot shaft 18 extending laterally at a position lower than an intermediate portion of the seat back 4 with respect to the vertical direction. Thus, because the lower part support member 8 is arranged such that the lower part thereof supports the occupant's ilia 61, the lower part support member 8 can push the ilia 61 of the occupant forward from behind to correct the rearward tilt angle of the ilia 61 (or pelvis) and to disperse the body pressure between the ilia 61 and the waist 62, whereby a vehicle seat highly comfortable to the occupant is provided.

The upper part support member 9 is disposed in an upper part of the seat back 4 to support the occupant's scapulae 71 and extends laterally to support the scapulae 71 of the seated occupants. Namely, the upper part support member 9 is disposed in a position favorable for holding the upper part of the occupant's back and dispersing the body pressure in accordance with a specific shape of the occupant's back. The upper part support member 9 is pivotably supported, at a lower end part thereof, by the seat back frame 45 via a pivot shaft 19 extending laterally at a position higher than the intermediate portion of the seat back 4 with respect to the vertical direction, and is configured to support the occupant's scapulae 71 from behind. The upper part support member 9 is controlled to push the scapulae 71 from behind to make the scapulae 71 tilt forward as necessary, and to disperse the body pressure on the waist 62 of the occupant, whereby a vehicle seat highly comfortable to the occupant is provided.

Figure 2:
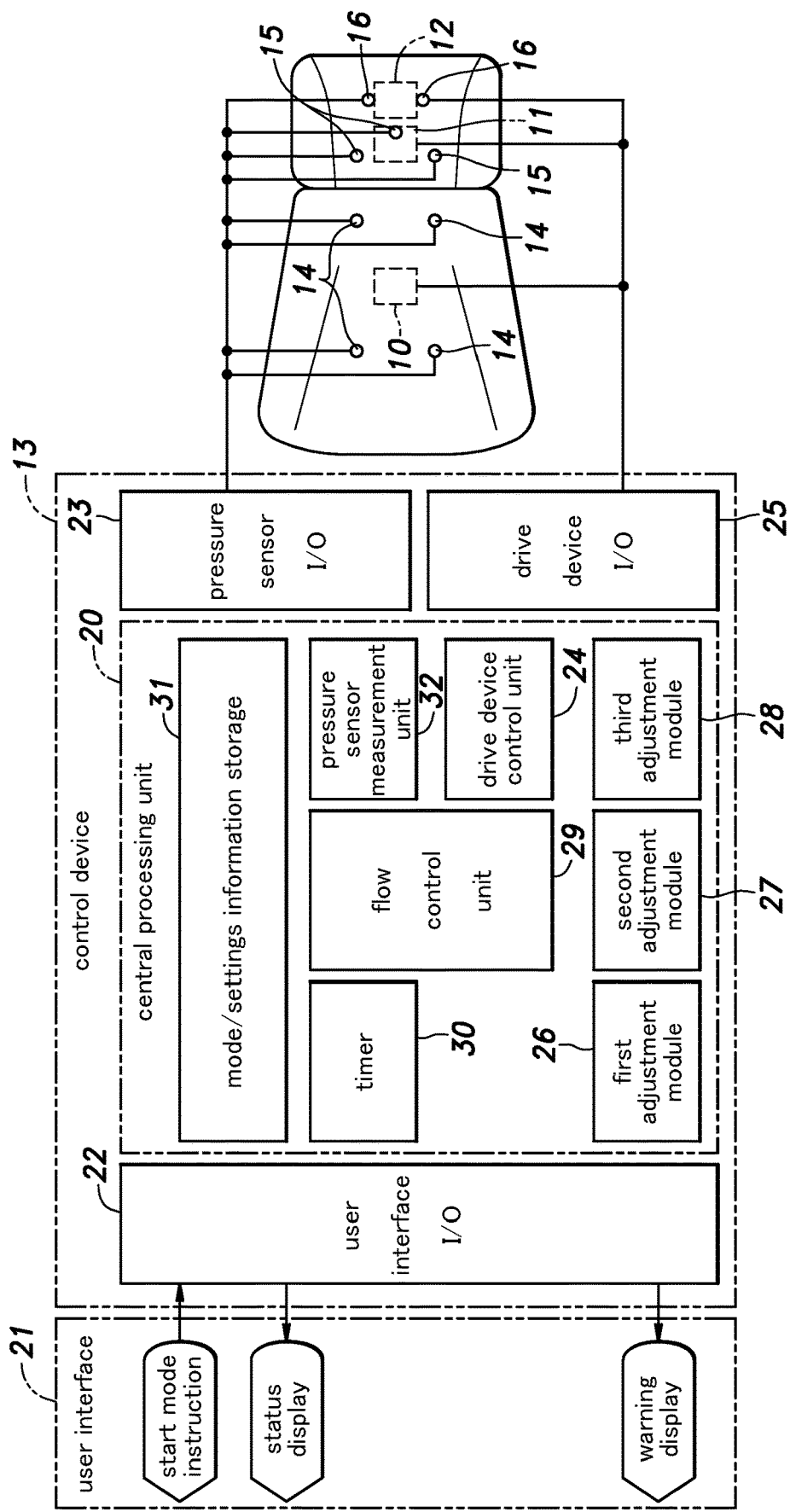
FIG. 2 is a functional block diagram of a control device.

Using data from the first to third body pressure sensors 14-16 pasted onto the padding material at positions near the bottom support member 7, the lower part support member 8, and the upper part support member 9, the control device 13 shown in FIG. 2 performs motion control to operate the first to third drive devices 10-12 to appropriately support the thighs, buttocks and lower and upper parts of the back of the seated occupant. More specifically, the motion control is performed by the first adjustment module 26, the second adjustment module 27, and the third adjustment module 28 of the central processing unit 20.

Next, with reference to FIGS. 7 to 9, description will be made of cooperative control for optimally supporting the thighs 51, the buttocks, and the lower and upper parts of the back of the seated occupant.

<Process Performed by First Adjustment Module 26>
(Step S10: Status Display)

Figure 7:
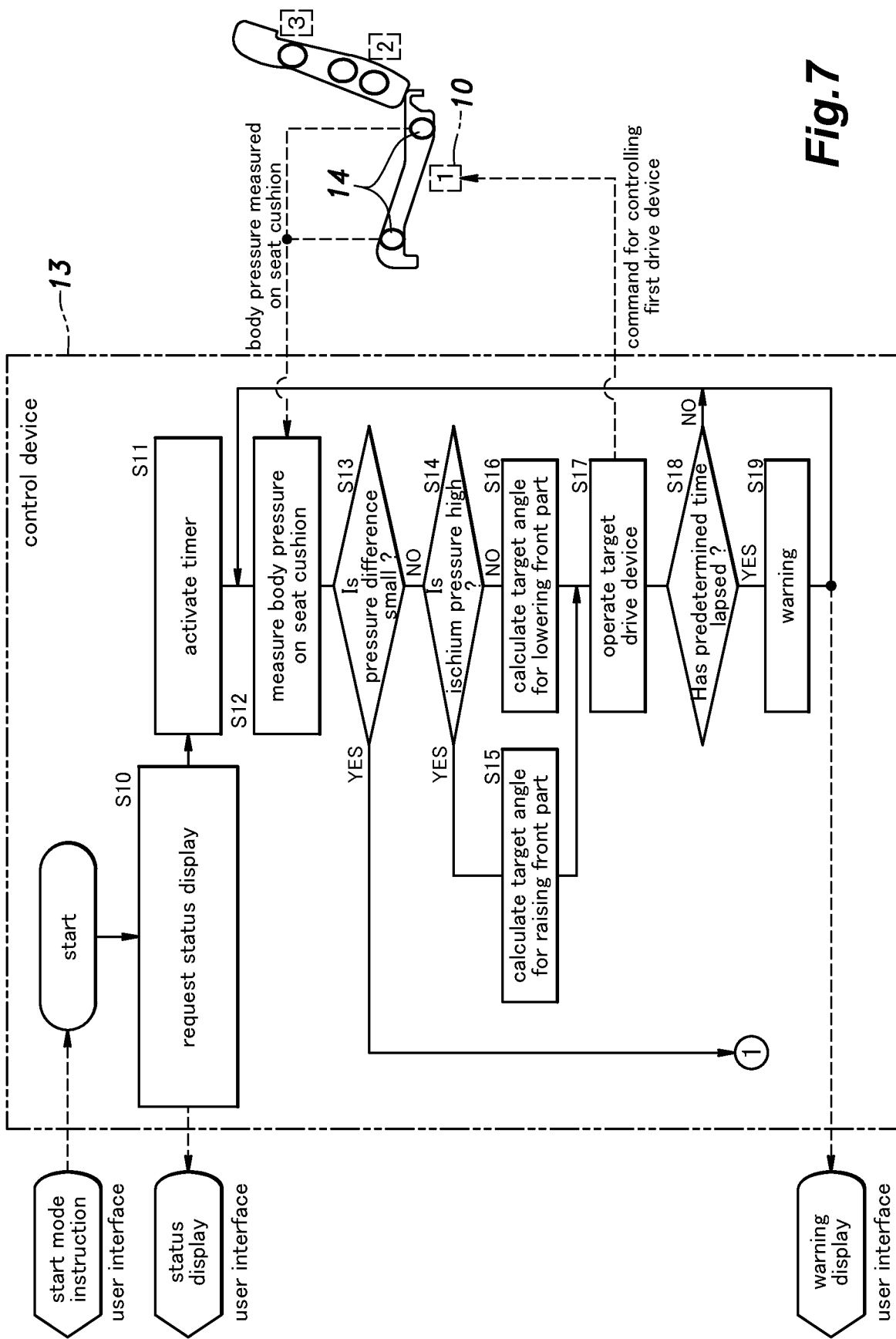
FIG. 7 is a flowchart showing an operation of a first adjustment module of a control device.

The process shown in FIG. 7, which is performed by the first adjustment module 26 to control the seating surface of the seat cushion 3 to properly distribute the body pressure between the thighs 51 and the ischia 52 of the seated occupant, is started when the occupant instructs the start by operating an operation input portion of the user interface 21. More specifically, when the control device 13 receives a seat control start signal from the user interface 21, the first adjustment module 26 starts the control in step S10. In step S10, a request for displaying a status that adjustment of the shape of the seating surface of the seat cushion 3 has been started is transmitted to the user interface 21 via the user interface I/O 22, and in response thereto, the user interface 21 displays the status accordingly.

(Step S11: Timer Activation)

When an operation mode is selected by the occupant by operating the user interface 21 or when it is determined that a default operation mode is selected, a timer activation is performed in a first processing step S11 such that a start time is set and stored temporarily in a work memory, and a timer function is started to operate. The timer function may respond to a request by providing the requester with an operation time of the first adjustment module 26 elapsed from step S10 or may raise a timer interrupt to the control flow when a predetermined time has lapsed. The process further proceeds to step S12.

(Step S12: Measurement of Body Pressure on Seat Cushion 3)

In step S12, the body pressure on the seat cushion 3 is measured. Pressure signals from the front pair of first body pressure sensors 14 near the thighs 51 of the seated occupant and the rear pair of first body pressure sensors 14 near the ischia 52 of the seated occupant are sampled here. The pressure signals from the first body pressure sensors 14, which are temporarily stored in the pressure sensor measurement unit 32, are read in by the first adjustment module 26. The pressure signal values from each sensor may be averaged over time windows, and/or the pressure signal values from multiple first body pressure sensors 14 may be averaged. If necessary, filtering for noise cancelling may be performed.

(Step S13: Assessment of Body Pressure Difference in Seat Cushion 3)

In step S13, it is determined whether the pressure difference between the thighs 51 and the ischia 52 is smaller than a predetermined pressure difference (threshold value) based on the body pressure values detected by the first body pressure sensors 14. If the pressure difference is smaller than the predetermined pressure difference, there is no need to disperse the body pressure, and therefore, the process performed by the first adjustment module 26 is terminated and the control is returned to the flow control unit 29. On the other hand, if the pressure difference is equal to or greater than the predetermined pressure difference, the process proceeds to step S14.

(Step S14: Assessment of Ischium Pressure on the Seat Cushion 3)

In step S14, it is determined whether the body pressure detected by each of the rear pair of first body pressure sensors 14 is higher than a predetermined ischium pressure value. If the ischium pressure detected by one or both of the rear first body pressure sensors 14 is higher than the predetermined value, the process proceeds to step S15 to raise the front part of the bottom support member 7 to shift an excess pressure to the thighs 51. If the ischium pressure detected by each rear first body pressure sensor 14 is lower than the predetermined value, the process proceeds to step S16 to lower the front part of the bottom support member 7.

(Step S15: Calculation for Raising Front Part of Bottom Support Member 7)

In step S15, in accordance with a deviation of the pressure difference calculated based on the outputs from the first body pressure sensors 14 from the associated predetermined value (predetermined pressure difference) and a deviation of the detected ischium pressure from the associated predetermined value (predetermined ischium pressure), a desired amount of upward movement of the front part of the bottom support member 7 is determined, and a corresponding desired angular rotation of the pivot shaft 17 of the bottom support member 7 is calculated. The desired angular rotation of the pivot shaft 17 is calculated such that the rear part of the buttocks is lowered to such an extent that the ischium pressure becomes equal to or lower than the predetermined value and the pressure difference in the seat cushion 3 becomes smaller than the predetermined value. Here, the first drive device 10 serves as a target drive device, and a target value of an angular drive amount (or target angle) for the actuator of the first drive device 10 is calculated in accordance with the desired angular rotation of the pivot shaft 17. In the calculation of the target angle of the first drive device 10 (or the desired angular rotation of the pivot shaft 17), a calculation mode may be selected depending on various factors such as the vehicle driving mode (highway, urban area, etc.), the road surface conditions, and the occupant's attributes. After the target angle of the first drive device 10 is determined, the process proceeds to step S17.

(Step S16: Calculation for Lowering Front Part of Bottom Support Member 7)

In step S16, in accordance with the deviation of the pressure difference calculated based on the outputs from the first body pressure sensors 14 from the associated predetermined value (predetermined pressure difference) and the deviation of the detected ischium pressure from the associated predetermined value (predetermined ischium pressure), a desired amount of downward movement of the front part of the bottom support member 7 is determined, and a corresponding desired angular rotation of the pivot shaft 17 of the bottom support member 7 is calculated. The desired angular rotation of the pivot shaft 17 is calculated such that the rear part of the buttocks is raised to such an extent that the pressure difference in the seat cushion 3 becomes smaller than the predetermined value while the ischium pressure is kept lower than the predetermined value. Here again, the target drive device is the first drive device 10, and the target value of the angular drive amount (or target angle) for the actuator of the first drive device 10 is calculated in accordance with the desired angular rotation of the pivot shaft 17. In the calculation of the target angle of the first drive device 10 (or the desired angular rotation of the pivot shaft 17), a calculation mode may be selected taking into account the pre-selected vehicle driving mode and/or any other factors. After the target angle is determined, the process proceeds to step S17.

(Step S17: Operation of Target Drive Device) In step S17, a request is transmitted to the drive device control unit 24 to drive the first drive device 10, which is the target drive device here, in accordance with the target angle (or target drive amount) of the first drive device 10. The drive device control unit 24 outputs a command to the first drive device 10 via the drive device I/O 25 to achieve the target drive amount. The first drive device 10 adjusts operation parameters of the associated actuator to achieve the target drive amount (target angle). After the target angle of the first drive device 10 is achieved, the first adjustment module 26 maintains that state. The process further proceeds to step S18.

(Step S18: Determination of Whether Predetermined Time has Lapsed)

In step S18, it is determined by means of the timer 30 whether a predetermined time has lapsed. If the predetermined time has lapsed, the process proceeds to step S19.

If not, the process returns to step S12.

(Step S19: Warning)

In step S19, a request for display warning is transmitted to the user interface 21 via the user interface I/O 22. Thereafter, the process is returned to step S12. In response to the request, the user interface 21 displays, in a status display screen thereof, a warning indicating that the predetermined time has lapsed, and prompts the occupant to correct the posture on the seating surface.

If appropriate body pressure dispersion on the seat cushion 3 is achieved owing to the foregoing process performed by the first adjustment module 26 and it is determined in step S13 that the pressure difference is smaller than the predetermined pressure difference, then the process performed by the first adjustment module 26 is completed. The operation state of the bottom support member 7 is maintained by the first adjustment module 26. Thereby, the body pressure dispersion on the seat cushion 3 is maintained.

<Process Performed by Second Adjustment Module 27>

(Step S20: Status Display)

Figure 8:
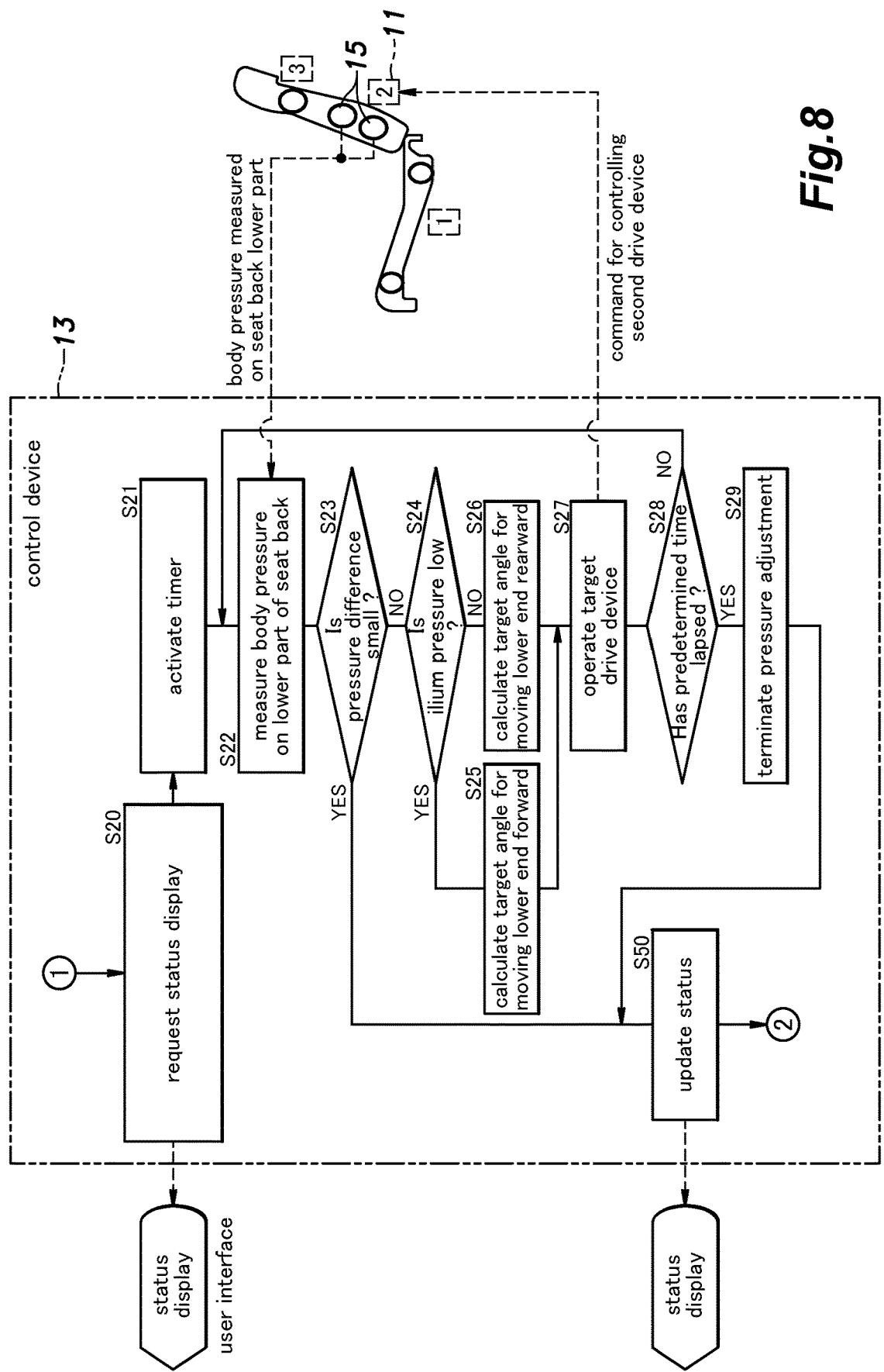
FIG. 8 is a flowchart showing an operation of a second adjustment module of the control device.

The process shown in FIG. 8 is performed by the second adjustment module 27, which is activated by the flow control unit 29. Following the process performed by the first adjustment module 26, in the process performed by the second adjustment module 27, the lower part support member 8 in the seat back 4 is controlled to change the shape of the seat surface of the upper part of the seat back 4 in accordance with the particular shape of a body part of the seated occupant from the ilia 61 (pelvis) to the waist so as to properly adjust the body pressure distribution between the waist 62 and the ilia 61 of the occupant. Upon start of the process performed by the second adjustment module 27, in step 20, a request for displaying a status that adjustment of the shape of the seat surface of the lower part of the seat back 4 has been started is transmitted to the user interface 21 via the user interface I/O 22, and in response thereto, the user interface 21 updates the displayed status accordingly.

(Step S21: Timer Activation)

After step S20, a timer is activated in step S21 such that a start time is set and stored temporarily in the work memory, and a timer function is started to operate. The timer function may respond to a request by providing the requester with an operation time of the second adjustment module 27 elapsed from step S20 or may raise a timer interrupt to the control flow when a predetermined time has lapsed.

(Step S22: Measurement of Body Pressure on Lower Part of Seat Back 4)

In step S22, the body pressure on the lower part of the seat back 4 is measured. Pressure signals from the upper second body pressure sensor 15 near the waist 62 of the seated occupant and the lower second body pressure sensors 15 near the ilia 61 or the seated occupant are sampled here. The pressure signal values from each sensor may be averaged over time windows, and/or the pressure signal values from multiple second body pressure sensors 15 may be averaged. If necessary, filtering for noise cancelling may be performed.

(Step S23: Assessment of Body Pressure Difference in Lower Part of Seat Back 4)

In step S23, it is determined whether the pressure difference between the waist 62 and the ilia 61 is smaller than a predetermined pressure difference (threshold value) based on the body pressure values detected by the second body pressure sensors 15. If the pressure difference is smaller than the predetermined pressure difference, there is no need to disperse the body pressure, and therefore, the process performed by the second adjustment module 27 is terminated, and the process proceeds to step S50. If the pressure difference is equal to or greater than the predetermined pressure difference, the process proceeds to step S24.

(Step S24: Assessment of Ilium Pressure on Seat Back 4)

In step S24, it is determined whether the body pressure detected by each of the lower second body pressure sensors 15 is lower than a predetermined ilium pressure value. If the ilium pressure detected by one or both of the lower second body pressure sensors 15 is lower than the predetermined value, the process proceeds to step S25 to push the lower end of the lower part support member 8 forward to shift some of the body pressure on the waist 62 to the ilia 61. If the ilium pressure detected by each lower second body pressure sensor 15 is higher than the predetermined value, the process proceeds to step S26 to move the lower end of the lower part support member 8 rearward.

(Step S25: Calculation for Pushing Lower End of Lower Part of Support Member 8 Forward)

In step S25, in accordance with a deviation of the pressure difference calculated based on the output from the second body pressure sensors 15 from the associated predetermined value and a deviation of the detected ilium pressure from the associated predetermined value, a desired amount of forward movement of the lower end of the lower part support member 8 is determined, and a corresponding desired angular rotation of the pivot shaft 18 of the lower part support member 8 is calculated. The desired angular rotation of the pivot shaft 18 is calculated such that the rear part of each ilium 61 is pushed forward to such an extent that the pressure difference in the seat back 4 becomes smaller than the predetermined value while the body pressure on each ilium 61 is kept lower than the predetermined value. Here, the target drive device is the second drive device 11, and a target value of an angular drive amount (or target angle) for the actuator of the second drive device 11 is calculated in accordance with the desired angular rotation of the pivot shaft 18. In the calculation of the target angle of the second drive device 11 (or the desired angular rotation of the pivot shaft 18), a calculation mode may be selected depending on the pre-selected vehicle driving mode and/or any other factors. After the target angle is determined, the process proceeds to step S27.

(Step S26: Calculation for Moving Lower End of Lower Part Support Member 8 Rearward)

In step S26, in accordance with the deviation of the pressure difference calculated based on the outputs from the second body pressure sensors 15 from the associated predetermined value and the deviation of the detected ilium pressure from the associated predetermined value, a desired amount of rearward movement of the lower end of the lower part support member 8 is determined, and a corresponding desired angular rotation of the pivot shaft 18 of the lower part support member 8 is calculated. The desired angular rotation of the pivot shaft 18 is calculated such that the rear part of each ilium 61 is moved rearward to such an extent that the pressure difference in the seat back 4 becomes smaller than the predetermined value and the body pressure on each ilium 61 becomes lower than the predetermined value. Here again, the target drive device is the second drive device 11, and a target value of an angular drive amount (or target angle) for the actuator of the second drive device 11 is calculated in accordance with the desired angular rotation of the pivot shaft 18. In the calculation of the target angle of the second drive device 11 (or the desired angular rotation of the pivot shaft 18), a calculation mode may be selected depending on the pre-selected vehicle driving mode and/or any other factors. After the target angle is determined, the process proceeds to step S27.

(Step S27: Operation of Target Drive Device)

In step S27, a request is transmitted to the drive device control unit 24 to drive the second drive device 11, which is the target drive device here, in accordance with the target angle (or target drive amount) of the second drive device 11. The drive device control unit 24 outputs a command to the second drive device 11 via the drive device I/O 25 to achieve the target drive amount. The second drive device 11 adjusts operation parameters of the associated actuator to achieve the target drive amount (target angle). After the target angle of the second drive device 11 is achieved, the second adjustment module 27 maintains that state. The process further proceeds to step S28.

(Step S28: Determination of Whether Predetermined Time has Lapsed)

In step S28, it is determined by means of the timer 30 whether a predetermined time has lapsed. If the predetermined time has lapsed, the process proceeds to step S29.

If not, the process returns to step S22.

(Step S29: Termination of Pressure Adjustment by Second Adjustment Module 27)

In step S29, it is determined that the target pressure difference (predetermined pressure difference) could not be achieved and the pressure difference adjustment by the second adjustment module 27 is determined to be terminated. Then, the process proceeds to step S50.

(Step S50: Status Update)

In step S50, a request is made to the user interface 21 via the user interface I/O 22 to display the status that the body pressure dispersion of the lower part of the seat back 4 has been terminated. The control is returned to the flow control unit 29, and the flow control unit 29 activates the third adjustment module 28. The state of the lower part support member 8 is maintained by the second adjustment module 27. Thereby, the body pressure dispersion on the lower part of the seat back 4 is maintained.

After an appropriate body pressure distribution on a part of the seat back 4 corresponding to the lower back of the seated occupant is achieved owing to the foregoing process performed by the second adjustment module 27, the third adjustment module 28 controls the upper part support member 9 in the seat back 4 to adjust the body pressure distribution on the upper part of the back of the seated occupant in accordance with the shape of the back of the occupant, as described below.

<Process Performed by Third Adjustment Module 28>

(Step S30: Status Display)

Figure 9:
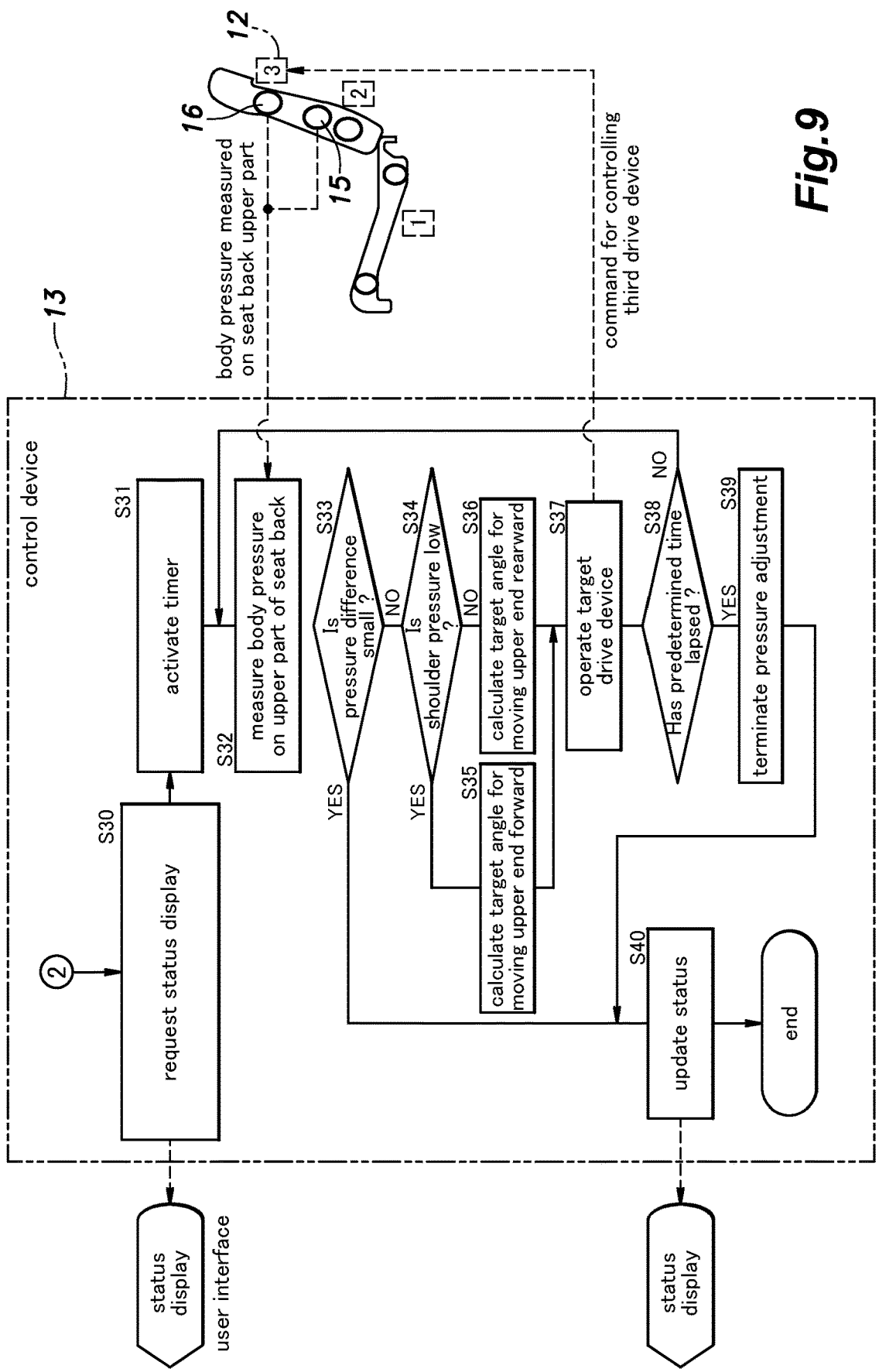
FIG. 9 is a flowchart showing an operation of a third adjustment module of the control device.

The process shown in FIG. 9 is performed by the third adjustment module 28, which is activated by the flow control unit 29. Following the process performed by the second adjustment module 27, in the process performed by the third adjustment module 28, the upper part support member 9 in the seat back 4 is controlled to change the shape of the seat surface of the upper part of the seat back 4 in accordance with the particular shape of the body part of the seated occupant from the waist 62 to the scapulae 71 so as to properly adjust the body pressure distribution between the waist 62 and the scapulae 71. Upon start of the process performed by the third adjustment module 28, in step 30, a request for displaying a status that adjustment of the shape of the seat surface of the upper part of the seat back 4 has been started is transmitted to the user interface 21 via the user interface I/O 22, and in response thereto, the user interface 21 updates the displayed status accordingly.

(Step S31: Timer Activation)

After step S30, a timer is activated in step S31 such that a start time is set and stored temporarily in the work memory, and a timer function is started to operate. The timer function may respond to a request by providing the requester with an operation time of the third adjustment module 28 elapsed from step S30 or may raise a timer interrupt to the control flow when a predetermined time has lapsed.

(Step S32: Measurement of Body Pressure on Upper Part of Seat Back 4)

In step S32, the body pressure on the upper part of the seat back 4 is measured. Pressure signals from the upper second body pressure sensor 15 near the waist 62 of the seated occupant and the third body pressure sensors 16 near the scapulae 71 of the seated occupant are sampled here. The pressure signals from each sensor may be averaged over time windows, and/or the pressure signals from multiple second body pressure sensors 15 or multiple third body pressure sensors 16 may be averaged. If necessary, filtering for noise cancelling may be performed.

(Step S33: Assessment of Body Pressure Difference in Upper Part of Seat Back 4)

In step S33, it is determined whether the pressure difference between the waist 62 and the scapulae 71 is smaller than a predetermined pressure difference (threshold value) based on the body pressure on the waist 62 detected by the upper second body pressure sensor 15 and the body pressure on the scapulae 71 detected by the third body pressure sensors 16. If the pressure difference is smaller than the predetermined pressure difference, there is no need to disperse the body pressure, and therefore, the process proceeds to step S40. If the pressure difference is equal to or greater than the predetermined pressure difference, the process proceeds to step S34.

(Step S34: Assessment of Shoulder (Scapula) Pressure on Seat Back 4)

In step S34, it is determined whether the body pressure detected by each of the third body pressure sensors 16 is lower than a predetermined pressure value. If the scapula pressure detected by one or both of the third body pressure sensors 16 is lower than the predetermined value, the process proceeds to step S35 to push the upper end of the upper part support member 9 forward. If the scapula pressure detected by each third body pressure sensor 16 is higher than the predetermined value, the process proceeds to step S36 to move the upper end of the upper part support member 9 rearward.

(Step S35: Calculation for Pushing Upper End of Upper Part Support Member 9 Forward)

In step S35, in accordance with a deviation of the pressure difference calculated based on the outputs from the upper second body pressure sensor 15 and the third body pressure sensors 16 from the associated predetermined value and a deviation of the detected scapula pressure from the associated predetermined value, a desired amount of forward movement of the upper end of the upper part support member 9 is determined, and a corresponding desired angular rotation of the pivot shaft 19 of the upper part support member 9 is calculated. The desired angular rotation of the pivot shaft 19 is calculated such that the scapulae 71 are pushed forward from behind to such an extent that the pressure difference in the seat back 4 becomes smaller than the predetermined value while the body pressure on each scapula 71 is kept lower than the predetermined value. Here, the target drive device is the third drive device 12, and a target value of an angular drive amount (or target angle) for the actuator of the third drive device 12 is calculated in accordance with the desired angular rotation of the pivot shaft 19. In the calculation of the target angle of the third drive device 12, a calculation mode may be selected depending on the pre-selected vehicle driving mode and/or any other factors. After the target angle is determined, the process proceeds to step S37.

(Step S36: Calculation for Moving Upper End of Upper Part Support Member 9 Rearward)

In step S36, in accordance with the deviation of the pressure difference calculated based on the outputs from the upper second body pressure sensor 15 and the third body pressure sensors 16 from the associated predetermined value and the deviation of the detected scapula pressure from the associated predetermined value, a desired amount of rearward movement of the upper end of the upper part support member 9 (or rearward tilt of the upper part support member 9) is determined, and a corresponding desired angular rotation of the pivot shaft 19 of the upper part support member 9 is calculated. The desired angular rotation of the pivot shaft 19 is calculated such that the scapulae 71 are moved rearward to such an extent that the pressure difference in the seat back 4 becomes smaller than the predetermined value and the body pressure on each scapula 71 becomes lower than the predetermined value. Here again, the target drive device is the third drive device 12, and a target value of an angular drive amount (or target angle) for the actuator of the third drive device 12 is calculated in accordance with the desired angular rotation of the pivot shaft 19. In the calculation of the target angle of the third drive device 12, a calculation mode may be selected depending on the pre-selected vehicle driving mode and/or any other factors. After the target angle is determined, the process proceeds to step S37.

(Step S37: Operation of Target Drive Device)

In step S37, a request is transmitted to the drive device control unit 24 to drive the third drive device 12, which is the target drive device here, in accordance with the target angle (or target drive amount) of the third drive device 12. The drive device control unit 24 outputs a command to the third drive device 12 via the drive device I/O 25 to achieve the target drive amount. The third drive device 12 adjusts operation parameters of the associated actuator to achieve the target drive amount (target angle). After the target angle of the third drive device 12 is achieved, the third adjustment module 28 maintains that state. The process further proceeds to step S38.

(Step S38: Determination of Whether Predetermined Time has Lapsed)

In step S38, it is determined by means of the timer 30 whether a predetermined time has lapsed. If the predetermined time has lapsed, the process proceeds to step S39. If not, the process returns to step S22.

(Step S39: Termination of Pressure Adjustment by Third Adjustment Module 28)

In step S39, it is determined that the target pressure difference (predetermined pressure difference) could not be achieved and the pressure difference adjustment by the third adjustment module 28 is determined to be terminated. Then, the process proceeds to step S40.

(Step S40: Status Update)

In step S40, a request is made to the user interface 21 via the user interface I/O 22 to display the status that the body pressure dispersion of the upper part of the seat back 4 has been terminated. The control is returned to the flow control unit 29, and the process is terminated.

By the process performed by the third adjustment module 28, the body pressure on the seat back 4 can be appropriately distributed between the scapulae 71 and the upper part of the waist 62 of the seated occupant; namely, body pressure dispersion can be properly adjusted for individual seated occupants.

Effects and advantages of the above-described embodiment of the occupant posture adjusting device 1 will be described below.

With regard to adjustment of the body pressure distribution on the seat cushion 3, when it is determined that the body pressure on the buttocks (ischia 52) of the seated occupant is undesirably high based on the outputs from the first body pressure sensors 14, the control device 13 (first adjustment module 26) controls the first drive device 10 such that the first drive device 10 rotates the plate-shaped bottom support member 7 in one direction about the pivot shaft 17 located just under the hip point HP to raise the front part of the bottom support member 7 to thereby push up the thighs 51 of the seated occupant from below, whereby the body pressure on the buttocks is reduced or the body pressure is partially shifted from the buttocks to the thighs 51. On the other hand, when it is determined that the body pressure on the thighs 51 of the seated occupant is undesirably high based on the outputs from the first body pressure sensors 14, the control device 13 controls the first drive device 10 such that the first drive device 10 rotates the plate-shaped bottom support member 7 in the other direction about the pivot shaft 17 to lower the front part of bottom support member 7 (and hence the thighs 51 also), whereby the body pressure on the thighs 51 is reduced or the body pressure is partially shifted from the thighs 51 to the buttocks. Thereby, an optimum occupant posture can be easily achieved.

With regard to adjustment of the body pressure distribution on the lower part of the seat back 4, when it is determined that the body pressure on the waist 62 of the seated occupant is undesirably high based on the outputs from the second body pressure sensors 15, the control device 13 (second adjustment module 27) controls the second drive device 11 such that the second drive device 11 rotates the plate-shaped lower part support member 8 in one direction about the pivot shaft 18 to push the ilia 61 of the seated occupant from behind, whereby the body pressure on the waist 62 is reduced or the body pressure is partially shifted or dispersed from the waist 62 to the ilia 61. On the other hand, when it is determined that body pressure on the ilia 61 of the seated occupant is undesirably high based on the outputs from the second body pressure sensors 15, the control device 13 controls the second drive device 11 such that the second drive device 11 rotates the plate-shaped lower part support member 8 in the other direction about the pivot shaft 18 to move the ilia 61 rearward, whereby the body pressure on the ilia 61 is reduced or the body pressure is partially shifted from the ilia 61 to the waist 62. Thereby, an optimum occupant posture can be easily achieved.

It is to be noted that the second body pressure sensor 15 for detecting the pressure on the waist 62 is preferably located to correspond to the third lumbar spine of the seated occupant, but the sensor may be replaced with one or more pressure sensors located near the third lumbar spine. When multiple pressure sensors on or near the third lumbar spine are used to detect the body pressure on the waist 62, the body pressures detected by the multiple pressure sensors may be averaged such that the average is used as the body pressure on the waist 62, with or without the outputs from the sensors being weighted according to the distance from the third lumbar spine.

With regard to adjustment of the body pressure distribution on the upper part of the seat back 4, when it is determined that the body pressure on the scapulae 71 of the seated occupant is undesirably low based on the outputs from the third body pressure sensors 16, the control device 13 controls the third drive device 12 such that the third drive device 12 rotates the plate-shaped upper part support member 9 in one direction about the pivot shaft 19 to push the scapulae 71 of the seated occupant from behind, whereby an appropriate abutment of the seat back on the shoulders of the occupant is achieved while the body pressure on the waist 62 is lowered or the body pressure is partially shifted or dispersed from the waist 62 to the scapulae 71. On the other hand, when it is determined that the body pressure on the waist 62 of the seated occupant is undesirably high based on the outputs from the second body pressure sensors 15, the control device 13 controls the third drive device 12 such that the third drive device 12 rotates the plate-shaped upper part support member 9 in the other direction about the pivot shaft 19 to move the scapulae 71 rearward, whereby the body pressure on the scapulae 71 is lowered or the body pressure is partially shifted or dispersed from the scapulae 71 to the waist 62.

In the occupant posture adjusting device 1 according to the present embodiment, the seated occupant's body pressure is measured, and the control device 13 is configured to automatically adjust the support of the various body parts of the seated occupant such as the ilia 61 and the scapulae 71 to achieve an appropriate body pressure values. It is often the case that the occupant does not know how to adjust the seat to achieve comfortable posture/body pressure distribution. Even in such a case, the occupant posture adjusting device 1 can perform automatic adjustment to prevent numb buttocks or dull pain on the waist 62 of the occupant that could be caused from an inappropriate posture or body pressure distribution. In the occupant posture adjusting device 1, the automatic adjustment by the first adjustment module 26 of the control device 13 to adjust the seating surface of the seat cushion 3 to achieve an appropriate pressure on the thighs and buttocks (ischia), the automatic adjustment by the second adjustment module 27 of the control device 13 to adjust the lower part of the seat back 4 supporting the ilia 61 (or pelvis) to achieve a posture providing a good balance of the pressure distribution on the back, and the automatic adjustment by the third adjustment module 28 of the control device 13 to adjust the posture around the shoulders to reduce the pressure on the back are performed sequentially in this order to achieve an appropriate occupant posture. The above automatic adjustment may be preferably performed after the occupant sets his/her preferred driving position so that the automatic adjustment can achieve an occupant posture causing less fatigue to the occupant in the set driving position.

As described above, in the present embodiment, the bottom support member 7 for pushing up or lowering the thighs 51 of the seated occupant is driven to rotate about the pivot shaft 17 located directly under the hip point HP shown in FIG. 5. Therefore, when the bottom support member 7 is rotated, the tilt angle of the pelvis of the seated occupant may change but the position of the hip point HP substantially does not change, and the rotation angle change about the pivot shaft 17 and the tilt angle change of the pelvis may substantially correspond to each other. As a result, the target drive angle calculation in step S15 and step S16 can be simplified. Further, the adjustment of the seating surface of the seat cushion 3 and the supporting surface of the seat back 4 is performed based on the body pressure outputs from the first to third body pressure sensors 14-16 obtained in step S12, step S22, and step S32, and these body pressure sensors 14-16 are located at positions supporting the various parts of the seated occupant. Specifically, the first to third body pressure sensors 14-16 are located at positions corresponding to the thighs 51, ischia 52, ilia 61, and scapulae 71 of the seated occupant. Thus, the pressures detected by these body pressure sensors 14-16 are closely related to the feeling of the occupant, whereby the adjustment based on the outputs of these sensors can reliably achieve an occupant's posture (or body pressure distribution) comfortable to the occupant. Yet further, because the control device 13 performs the adjustment of the lower part of the seat back 4 after the adjustment of the seat cushion 3, and the adjustment of the upper part of the seat back 4 after the adjustment of the lower part of the seat back 4, the optimum occupant posture can be achieved quickly with a reduced number of repeated adjustments. Furthermore, as described above with regard to step S13, step S23, and step S33, a body pressure difference between different positions is controlled to be smaller than a predetermined value. Thereby, an appropriate body pressure distribution can be achieved easily. Thus, the occupant posture adjusting device 1 of the seat 2 can support the seated occupant with an appropriate body pressure distribution and adjust the posture of the seated occupant to cause less fatigue to the occupant.

Figure 10:
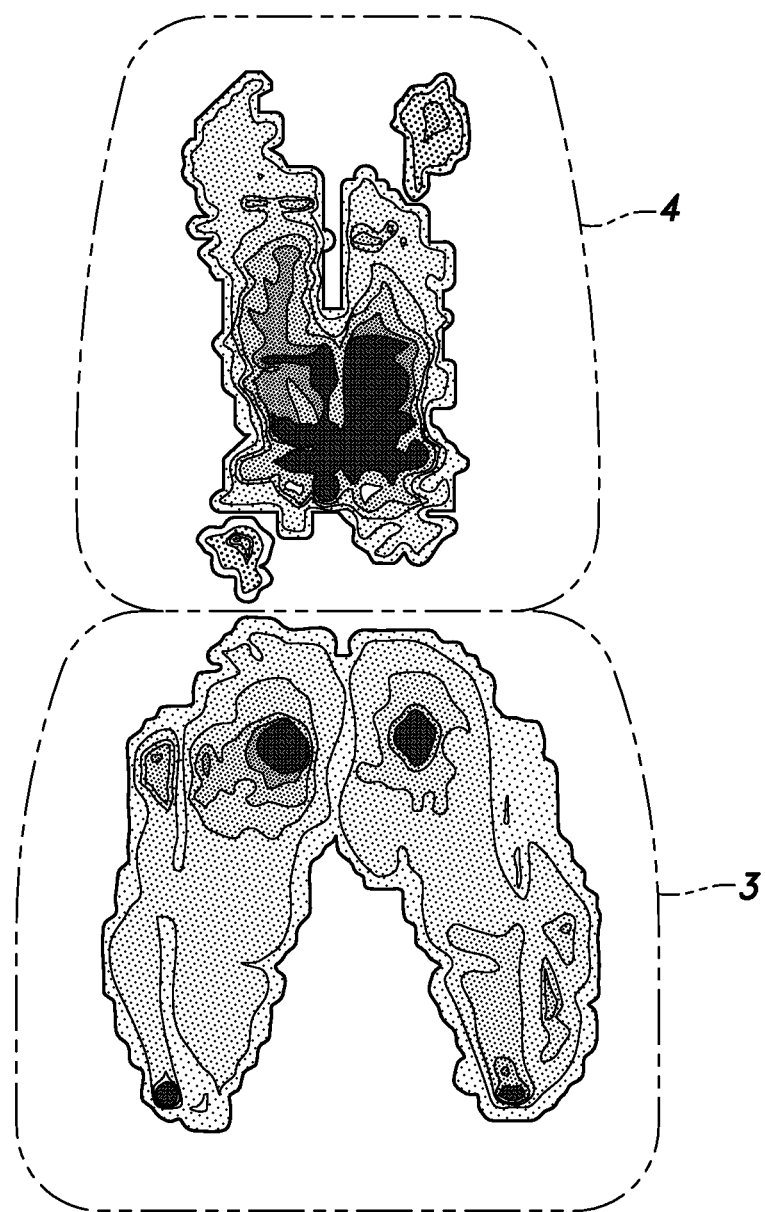
FIG. 10 is a body pressure measurement map before occupant posture adjustment.
Figure 11:
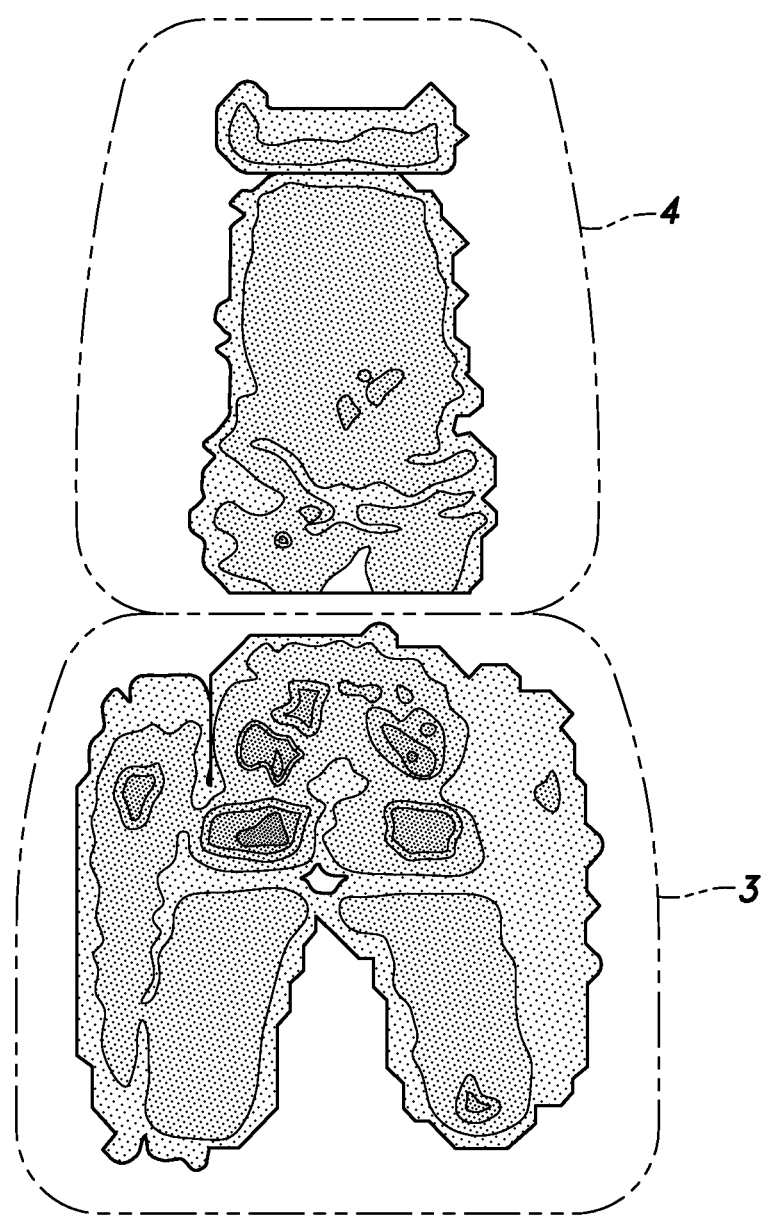
FIG. 11 is a body pressure measurement map after occupant posture adjustment.

Experimental results of the occupant posture adjustment according to the foregoing embodiment are shown in FIGS. 10 and 11. FIG. 10 shows the body pressure distribution before adjustment, while FIG. 11 shows the body pressure distribution after adjustment. In FIGS. 10 and 11, areas with higher body pressures are shown by darker shades in six gradations. As shown in FIG. 10, before adjustment, areas with the highest level pressure (darkest shade) are distributed widely on the seating surface and on the back. In contrast, as shown in FIG. 11, after the adjustment of the body pressure distribution by the occupant posture adjusting device 1, areas with the highest level pressure disappeared, and areas with the second highest level pressure also were reduced significantly.

Thus, the occupant posture adjusting device 1 of the seat 2 according to the embodiment of the present invention can adjust the posture of the seated occupant based on the measurement of the occupant's body pressure distribution, to thereby support the occupant with an appropriate body pressure distribution and cause less fatigue to the occupant.

In the foregoing, the present invention has been described in terms of the concrete embodiment thereof, but the present invention is not limited to the foregoing embodiment and various alterations and modifications may be made. For instance, the concrete structure, arrangement, number, etc. of the component parts or the concrete procedure in the embodiment(s) may be appropriately changed within the scope of the present invention. Also, not all of the structural elements shown in the above embodiment are necessarily indispensable and they may be selectively used as appropriate.

The invention claimed is:

1. An occupant posture adjusting device of a vehicle seat including a seat cushion and a seat back connected to a rear end of the seat cushion, the occupant posture adjusting device comprising:
   a plate-shaped bottom support member pivotably supported by the seat cushion via a pivot shaft extending laterally at a position directly under a hip point of an occupant seated in the seat, such that the bottom support member is capable of supporting thighs and ischia of the occupant from below;
   a plate-shaped lower part support member pivotably supported by the seat back via a pivot shaft extending laterally at a position lower than an intermediate portion of the seat back with respect to a vertical direction, such that the lower part support member is capable of supporting at least a pelvis of the occupant from behind;
   a plate-shaped upper part support member pivotably supported by the seat back via a pivot shaft extending laterally at a position higher than the intermediate portion of the seat back with respect to the vertical direction, such that the upper part support member is capable of supporting at least scapulae of the occupant from behind;
   first to third drive devices configured to drive the bottom support member, the lower part support member, and the upper part support member, respectively; and
   a control device configured to control the first to third drive devices,
   wherein the pivot shaft of the bottom support member is configured to be positioned between front of the thighs and the ischia of the seated occupant, the bottom support member has a front part configured to support the thighs and a rear part configured to support the ischia and is configured to take a first state in which the front part is raised and the rear part is lowered and a second state in which the rear part is raised and the front part is lowered.

2. The occupant posture adjusting device according to claim 1, further comprising front and rear first body pressure sensors associated with the bottom support member, the front and rear first body pressure sensors being disposed at positions corresponding to one of the thighs and one of ischia of the seated occupant, respectively, wherein the control device is configured to control the first drive device based on a comparison between outputs from the front and rear first body pressure sensors.

3. The occupant posture adjusting device according to claim 2, further comprising upper and lower second body pressure sensors associated with the lower part support member, the upper and lower second body pressure sensors being disposed at positions corresponding to a waist and one of ilia of the seated occupant, respectively, wherein the control device is configured to control the second drive device based on a comparison between outputs from the upper and lower second body pressure sensors.

4. The occupant posture adjusting device according to claim 3, wherein the control device is configured to operate the second drive device subsequent to operation of the first drive device.

5. The occupant posture adjusting device according to claim 4, further comprising at least one third body pressure sensor associated with the upper part support member, the at least one third body pressure sensor being disposed at a position corresponding to one of the scapulae of the seated occupant, wherein the control device is configured to control the third drive device based on a comparison between an output from the third body pressure sensor and the output from the upper second body pressure sensor.

6. The occupant posture adjusting device according to claim 5, wherein the control device is configured to operate the third drive device subsequent to operation of the second drive device.

7. The occupant posture adjusting device according to claim 6, wherein the control device is configured to cause the first drive device and the second drive device to maintain operation states thereof before activating the third drive device.

8. The occupant posture adjusting device according to claim 2, wherein the comparison is performed to determine whether a difference between pressures indicated by the outputs exceeds a predetermined threshold value.

9. The occupant posture adjusting device according to claim 2, wherein the control device includes a manual input device configured to receive input from the occupant, and the comparison is performed based on a mode selected by the occupant using the manual input device.

10. An occupant posture adjusting device of a vehicle seat including a seat cushion and a seat back connected to a rear end of the seat cushion, the occupant posture adjusting device comprising:
a plate-shaped bottom support member pivotably supported by the seat cushion via a pivot shaft extending laterally at a position directly under a hip point of an occupant seated in the seat, such that the bottom support member is capable of supporting at least thighs of the occupant from below;
a plate-shaped lower part support member pivotably supported by the seat back via a pivot shaft extending laterally at a position lower than an intermediate portion of the seat back with respect to a vertical direction, such that the lower part support member is capable of supporting at least a pelvis of the occupant from behind;
a plate-shaped upper part support member pivotably supported by the seat back via a pivot shaft extending laterally at a position higher than the intermediate portion of the seat back with respect to the vertical direction, such that the upper part support member is capable of supporting at least scapulae of the occupant from behind;
first to third drive devices configured to drive the bottom support member, the lower part support member, and the upper part support member, respectively;
a control device configured to control the first to third drive devices;
front and rear first body pressure sensors associated with the bottom support member, the front and rear first body pressure sensors being disposed at positions corresponding to one of the thighs and one of ischia of the seated occupant, respectively; and
upper and lower second body pressure sensors associated with the lower part support member, the upper and lower second body pressure sensors being disposed at positions corresponding to a waist and one of ilia of the seated occupant, respectively,
wherein the control device is configured to control the first drive device based on a comparison between outputs from the front and rear first body pressure sensors and control the second drive device based on a comparison between outputs from the upper and lower second body pressure sensors.

11. The occupant posture adjusting device according to claim 10, wherein the control device is configured to operate the second drive device subsequent to operation of the first drive device.

12. The occupant posture adjusting device according to claim 11, further comprising at least one third body pressure sensor associated with the upper part support member, the at least one third body pressure sensor being disposed at a position corresponding to one of the scapulae of the seated occupant, wherein the control device is configured to control the third drive device based on a comparison between an output from the third body pressure sensor and the output from the upper second body pressure sensor.

13. The occupant posture adjusting device according to claim 12, wherein the control device is configured operate the third drive device subsequent to operation of the second drive device.

14. The occupant posture adjusting device according to claim 13, wherein the control device is configured to cause the first drive device and the second drive device to maintain operation states thereof before activating the third drive device.

15. The occupant posture adjusting device according to claim 10, wherein the comparison is performed to determine whether a difference between pressures indicated by the outputs exceeds a predetermined threshold value.

16. The occupant posture adjusting device according to claim 10, wherein the control device includes a manual input device configured to receive input from the occupant, and the comparison is performed based on a mode selected by the occupant using the manual input device.

17. An occupant posture adjusting device of a vehicle seat including a seat cushion and a seat back connected to a rear end of the seat cushion, the occupant posture adjusting device comprising:
a plate-shaped bottom support member pivotably supported by the seat cushion via a pivot shaft extending laterally at a position directly under a hip point of an occupant seated in the seat, such that the bottom support member is capable of supporting at least thighs of the occupant from below;
a plate-shaped lower part support member pivotably supported by the seat back via a pivot shaft extending laterally at a position lower than an intermediate portion of the seat back with respect to a vertical direction, such that the lower part support member is capable of supporting at least a pelvis of the occupant from behind;
a plate-shaped upper part support member pivotably supported by the seat back via a pivot shaft extending laterally at a position higher than the intermediate portion of the seat back with respect to the vertical direction, such that the upper part support member is capable of supporting at least scapulae of the occupant from behind;
first to third drive devices configured to drive the bottom support member, the lower part support member, and the upper part support member, respectively;
a control device configured to control the first to third drive devices; and
front and rear first body pressure sensors associated with the bottom support member, the front and rear first body pressure sensors being disposed at positions corresponding to one of the thighs and one of ischia of the seated occupant, respectively,
wherein the control device is configured to control the first drive device based on a comparison between outputs from the front and rear first body pressure sensors, the comparison is performed to determine whether a difference between pressures indicated by the outputs exceeds a predetermined threshold value.

18. The occupant posture adjusting device according to claim 17, wherein the control device includes a manual input device configured to receive input from the occupant, and the comparison is performed based on a mode selected by the occupant using the manual input device.

* * * * *